United States Patent
Toyama et al.

(10) Patent No.: US 8,675,159 B2
(45) Date of Patent: Mar. 18, 2014

(54) LIQUID CRYSTAL DISPLAY DEVICE

(75) Inventors: Hirofumi Toyama, Kanagawa (JP); Yujiro Yanai, Kanagawa (JP); Naoyoshi Yamada, Kanagawa (JP); Katsufumi Ohmuro, Kanagawa (JP); Takumi Ando, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 119 days.

(21) Appl. No.: 13/416,802

(22) Filed: Mar. 9, 2012

(65) Prior Publication Data

US 2012/0229738 A1 Sep. 13, 2012

(30) Foreign Application Priority Data

Mar. 10, 2011 (JP) ................................ 2011-053407

(51) Int. Cl.
G02F 1/1335 (2006.01)

(52) U.S. Cl.
USPC .............................. 349/119; 349/97; 349/117

(58) Field of Classification Search
None
See application file for complete search history.

(56) References Cited

U.S. PATENT DOCUMENTS

| | | | |
|---|---|---|---|
| 8,237,893 B2 | 8/2012 | Utsumi et al. | |
| 8,368,858 B2 | 2/2013 | Hisakado et al. | |
| 2008/0158488 A1 | 7/2008 | Yanai et al. | |
| 2008/0192192 A1* | 8/2008 | Toyama et al. | 349/117 |
| 2009/0122243 A1 | 5/2009 | Sugiyama et al. | |
| 2010/0066948 A1 | 3/2010 | Hisakado et al. | |
| 2010/0245726 A1 | 9/2010 | Utsumi et al. | |

FOREIGN PATENT DOCUMENTS

| | | |
|---|---|---|
| JP | 2002-221622 A | 8/2002 |
| JP | 2005-331909 A | 12/2005 |
| JP | 2006-184640 A | 7/2006 |
| JP | 2008-176281 A | 7/2008 |
| JP | 2008-233654 A | 10/2008 |
| JP | 2009-181070 A | 8/2009 |
| JP | 2010-066435 A | 3/2010 |
| JP | 2010-134439 A | 6/2010 |
| JP | 2010-191146 A | 9/2010 |
| JP | 2010-230742 A | 10/2010 |
| WO | 2006/070936 A1 | 7/2006 |

OTHER PUBLICATIONS

Notification of Reasons for Rejection issued by JPO on Nov. 12, 2013, in connection with corresponding Japanese Patent Application No. 2011-053407.

* cited by examiner

*Primary Examiner* — Lucy Chien
(74) *Attorney, Agent, or Firm* — Jean C. Edwards; Edwards Neils PLLC

(57) ABSTRACT

Disclosed is a liquid crystal display device, wherein $u'_{on\ axis}$ and $v'_{on\ axis}$, $u'_{max}$ and $v'_{max}$, and $u'_{min}$ and $v'_{min}$ satisfy following expressions (1), (2) and (3):

$$u'_{ave} = \left(\frac{u'_{max} - u'_{min}}{2}\right),\ v'_{ave} = \left(\frac{v'_{max} - v'_{min}}{2}\right) \quad (1)$$

$$\Delta u'v'_{ave-on\ axis} = \sqrt{(u'_{ave} - u'_{on\ axis})^2 + (v'_{ave} - v'_{on\ axis})^2} \le 0.04 \quad (2)$$

$$0.35 \le v'_{on\ axis} \le 0.55 \quad (3)$$

wherein $u'_{on\ axis}$ and $v'_{on\ axis}$ are hues in a black state observed in a front direction; $u'_{max}$ and $v'_{max}$ are maximum values of u' and v' in a black state among values observed in directions with an azimuth angle ranging from 0° to 360° and a polar angle of 60°; and $u'_{min}$ and $v'_{min}$ are minimum values of u' and v' in a black state among values observed in directions with an azimuth angle ranging from 0° to 360° and a polar angle of 60°.

12 Claims, 1 Drawing Sheet

- Polarizing plate 12a
- Optical film 14a
- Liquid crystal cell 10
- Optical film 14b
- Polarizing plate 12b

LIQUID CRYSTAL DISPLAY DEVICE

CROSS-REFERENCE TO RELATED APPLICATIONS

The present application claims the benefit of priority from Japanese Patent Application No. 2011-053407, filed on Mar. 10, 2011, the contents of which are herein incorporated by reference in their entirety.

BACKGROUND OF THE INVENTION

1. Field of the Invention

The present invention relates to a technology for improving a display performance of a liquid crystal display device employing a vertically aligned mode (VA mode).

2. Background Art

In order to enhance the overall display quality of liquid crystal display devices, it is preferable that neither contrast change nor color change depending upon the viewing direction is observed. In particular, it is important to minimize the color change in the black state depending on the observation direction and to enhance a contrast ratio on the occasion of observation from various directions.

In order to minimize the color change of a liquid crystal display device in the black state when being observed in the oblique direction, there has hitherto been proposed a method of controlling the wavelength dispersion of retardation of an optical film (JP-A-2002-221622). However, following an increase in screen size in recent years, the difference of the display depending on the observation position has been more and more distinguishable, and that problem that the coloration of the display is different between when being observed in the normal direction and in the oblique direction has been recognized.

In order to make the hue observed in the oblique direction closer to the hue observed in the normal direction, there is known a method of adjusting retardation along the thickness direction of a color filter (JP-A-2009-181070). Although, according to this method, the hue change depending on the observation direction becomes small, the display suffers from being bluish as a whole.

On the other hand, in recent years, a high contrast ratio (CR) of a liquid crystal display device is being advanced. In particular, VA-mode liquid crystal display devices have an advantage that CR in the direction normal to a screen (hereinafter referred to as "front CR") is high as compared with other modes, and researches and developments are made for further improving the advantage. As a result, in these 6 years, the front CR in VA-mode liquid crystal display devices has increased from about 400 to about 8,000, or by about 20 times.

Also, in order to increase a contrast ratio observed in the oblique direction (hereinafter referred to as "viewing angle CR"), there is known a method of controlling a retardation of the optical film (for example, JP-A-2006-184640).

Besides the hue, in order to improve the display quality, increasing a contrast ratio observed in the horizontal direction (hereinafter referred to as "horizontal CR") is also required.

SUMMARY OF THE INVENTION

As described above, conventional liquid crystal display devices suffered from the hue differing between when being observed in the front direction (the direction normal to a visual surface) and in the oblique direction, or suffered from the bluish hue observed in any directions.

Accordingly, an object of the present invention is to provide a liquid crystal display device wherein not only a hue difference in the black state between when being observed in the front direction and in the oblique direction is small but also the hue is neutral.

Another object of the invention is to provide a liquid crystal display device wherein in addition to the front CR and the viewing angle CR, the horizontal CR is increased.

The means for achieving the above-described objects are as follows.

<1> A liquid crystal display device, wherein $u'_{on\ axis}$ and $v'_{on\ axis}$, $u'_{max}$ and $v'_{max}$, and $u'_{min}$ and $v'_{min}$ satisfy following expressions (1), (2) and (3):

$$u'_{ave} = \left(\frac{u'_{max} - u'_{min}}{2}\right), v'_{ave} = \left(\frac{v'_{max} - v'_{min}}{2}\right) \quad (1)$$

$$\Delta u'v'_{ave-on\ axis} = \sqrt{(u'_{ave} - u'_{on\ axis})^2 + (v'_{ave} - v'_{on\ axis})^2} \leq 0.04 \quad (2)$$

$$0.35 \leq v'_{on\ axis} \leq 0.55 \quad (3)$$

wherein $u'_{on\ axis}$ and $v'_{on\ axis}$ axis are hues in a black state observed in a front direction;

$u'_{max}$ and $v'_{max}$ are maximum values of u' and v' in a black state among values observed in directions with an azimuth angle ranging from 0° to 360° and a polar angle of 60°; and $u'_{min}$ and $v'_{min}$ are minimum values of u' and v' in a black state among values observed in directions with an azimuth angle ranging from 0° to 360° and a polar angle of 60°.

<2> The liquid crystal display device according to <1>, which satisfies following expression (4):

$$\Delta u'v'_{60°} = \sqrt{(u'_{max} - u'_{min}) + (v'_{max} - v'_{min})^2} < 0.04 \quad (4)$$

<3> The liquid crystal display device according to <1> or <2>, comprising at least one polarizing plate of which hues $u'_{\_pol}$ $v'_{\_pol}$ satisfy following expressions (5) and (6):

$$0.16 \leq u'_{\_pol} \leq 0.24 \quad (5)$$

$$0.38 \leq v'_{\_pol} \leq 0.50 \quad (6)$$

wherein the hues $u'_{\_pol}$ $v'_{\_pol}$ are hues of the polarizing plate in an orthogonal state.

<4> The liquid crystal display device according to any one of <1> to <3>, comprising at least one polarizing plate of which a crossed transmittance at a wavelength of 410 nm is equal to or less than 0.03%.

<5> The liquid crystal display device according to any one of <1> to <4>, comprising:

a liquid crystal cell, a pair of polarizing plates, absorption axes of which are orthogonal to each other, and an optical film disposed between each of the pair of polarizing plates and the liquid crystal cell, wherein D.I.(0°) and D.I.(30°) of the liquid crystal cell and the optical film satisfy following expressions (7) and (8):

$$D.I.(30°)/D.I.(0°) < 4.0 \quad (7)$$

$$D.I.(0°) < 0.04\% \quad (8)$$

where

D.I.(0°) and D.I.(30°) are values observed in a front direction and in a direction of 30° along a horizontal direction respectively <6> The liquid crystal display device according to any one of <1> to <5>, comprising:
   a liquid crystal cell,
   a pair of polarizing plates, absorption axes of which are orthogonal to each other, and
   an optical film disposed between each of the pair of polarizing plates and the liquid crystal cell, wherein
   D.I.(0°) and D.I.(30°) of the liquid crystal cell satisfy following expressions (9) and (10):

$$D.I.(30°)/D.I.(0°)<4.0 \quad (9)$$

$$D.I.(0°)<0.03\% \quad (10)$$

where
D.I.(0°) and D.I.(30°) are values observed in a front direction and in a direction of 30° along a horizontal direction respectively <7> The liquid crystal display device according to any one of <1> to <6>, comprising:
   a liquid crystal cell and
   a polarizing plate disposed on at least one of the outer sides of the liquid crystal cell, wherein
   the liquid crystal cell comprises:
   a pair of substrates disposed facing with each other, one of which is provided with an electrode,
   a liquid crystal layer disposed between the substrates which comprises three pixel regions, first, second and third pixel regions, and
   color filters, disposed on the first, second and third pixel regions respectively, having wavelength selectivity on transmittance and having a maximum transmittance at a main wavelength of $\lambda1$, $\lambda2$ and $\lambda3$ (unit: nm) respectively, which satisfies a relation $\lambda_1<\lambda_2<\lambda_3$; and a thickness of the liquid crystal layer, d1, d2, and d3 (unit: nm), corresponding to the first, second and third pixel regions respectively satisfy following relation (11):

$$d2<d3 \quad (11).$$

<8> The liquid crystal display device according to <7>, satisfying following expression (12):

$$d1<d2<d3 \quad (12).$$

<9> The liquid crystal display device according to any one of <1> to <8>, wherein the optical film satisfies following expressions (13) and (14):

$$20 \text{ nm} \leq Re \leq 100 \text{ nm} \quad (13)$$

$$70 \text{ nm} \leq Rth \leq 300 \text{ nm} \quad (14).$$

<10> The liquid crystal display device according to any one of <5> to <9>, wherein retardation in-plane of the optical film at a wavelength of 450, Re(450), retardation in-plane of the optical film at a wavelength of 550 nm, Re(550), and retardation in-plane of the optical film at a wavelength of 650 nm, Re(650) satisfy following expressions (15) and (16):

$$0.75 \leq Re(450)/Re(550) \leq 1.00 \quad (15)$$

$$1.00 \leq Re(650)/Re(550) \leq 1.25 \quad (16).$$

<11> The liquid crystal display device according to any one of <5> to <10>, wherein an internal haze of the optical film is equal to or less than 0.05%.

<12> The liquid crystal display device according to any one of <1> to <11>, employing a vertically aligned mode.

According to the present invention, it is possible to provide a liquid crystal display device wherein not only a hue difference in the black state between when being observed in the front direction and in the oblique direction is small but also the hue is neutral, and also to provide a liquid crystal display device employing a vertically-alignment mode (VA mode) excellent in the comprehensive displaying quality wherein in addition to the front CR and the viewing angle CR, the horizontal CR is increased.

DETAILED DESCRIPTION OF THE INVENTION

Figure 1:
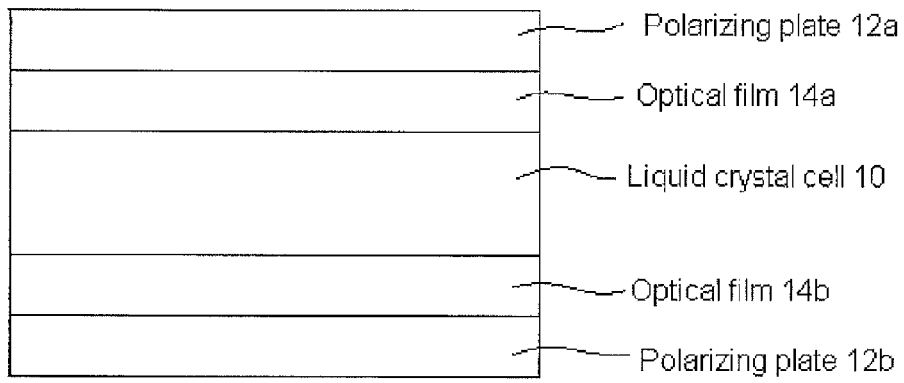
FIG. 1 is a cross-sectional schematic view of an example of a liquid crystal display device of the present invention.
Figure 2:
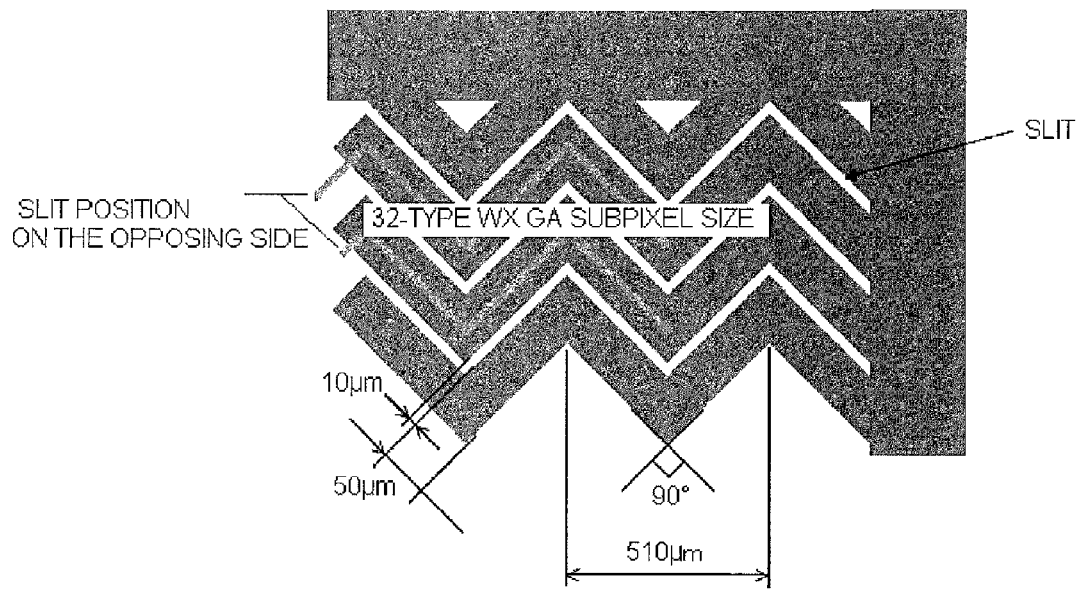
FIG. 2 is an upper surface schematic view showing an electrode configuration of a liquid crystal cell utilized in the Examples.

The present invention is hereunder described in detail by reference to embodiments. Incidentally, in this specification, a numerical range expressed by the terms "a number to another number" means a range falling between the former number indicating a lower limit value of the range and the latter number indicating an upper limit value thereof.

First of all, terminologies used in this specification and measuring methods thereof are described.
(Hue u',v')

In the specification, u' and v' are the chromaticity coordinates in the CIE L*u*v* color system.

Details definitions and measuring methods are described in JIS Z8729. For example, specifically, the hues u' and v' of a polarizing plate are determined in the following manner. That is, under an integrating sphere-equipped condition using a standard light source (C light source) specified in JIS Z8720 as a light source, a spectral transmittance of a polarizing plate in a visible region is measured in a wavelength region for measurement of from 380 to 780 nm by using a spectrophotometer V7070 (manufactured by JASCO Corporation), the measured spectral transmittance is multiplied by a color matching function and integrated to determine tristimulus values X, Y and Z, and the hues u' and v' of the polarizing plate can be determined according to the CIE1976 u'v' color space.

Incidentally, in the invention, the chromaticity coordinates u' and v' as measured under each condition are expressed in the following manner.

$u'_{on\ axis}$ and $v'_{on\ axis}$: Values of u' and v' in a black state observed in a front direction;

$u'_{max}$ and $v'_{max}$: Maximum values of u' and v' in a black state among the values observed in directions with an azimuth angle ranging from 0° to 360° and a polar angle of 60°;

$u'_{min}$ and $v'_{min}$: Minimum values of u' and v' in a black state among the values observed in directions with an azimuth angle ranging from 0° to 360° and a polar angle of 60°;

$u'_{\_pol}$ $v'_{\_pol}$: Values of u' and v' a polarizing plate in an orthogonal state.

(Hue Variation Δu'v')

$\Delta u'v'_{ave-on\ axis}$: An averaged distance in the u'v' space between the hue observed in the front direction and the hue variation (hue difference or color shift) observed in any direction with an azimuth angle ranging from 0° to 360° and a polar angle of 60°), which is calculated according to the following expression.

$$\Delta u'v'_{ave-on\ axis} = \sqrt{(u'_{ave}-u'_{onaxis})^2+(v'_{ave}-v'_{onaxis})^2}$$

$\Delta u'v'_{60°}$: A maximum distance in the u'v' space among those observed in the directions with a polar angle of 60° and an azimuth angle ranging from 0° to 360°), which is calculated according to the following expression.

$$\Delta u'v'_{60°} = \sqrt{(u'_{max} - u'_{min})^2 + (v'_{max} - v'_{min})^2}$$

(Contrast)

The contrast of the liquid crystal display device is defined as a value obtained by dividing brightness in the white state by brightness in the black state in each observation direction.

Brightness and a chromaticity in the black state and in the white state are measured in a dark room respectively by using an analyzer (EZ-Contrast XL88, manufactured by ELDIM); and a hue in the black state, a color shift and a contrast ratio are calculated.

(D.I.)

D.I. of each constituent member is a value expressing a degree of a loss of polarization caused by passing through the constituent member; and the constituent member having a lower D.I. means that it contains the components capable of keeping the polarization state in a larger amount.

D.I. may be measured according to the methods described in Y. Utsumi, et al.: "Improved contrast ratio in IPS-Pro LCD TV by using quantitative analysis of depolarized light leakage from component materials?", SID International Symposium Digest 39, p. 129(2008); and Y. Utsumi, et al.: "Reduced Light Scattering Intensity from Liquid Crystal for Higher Contrast Ratio in IPS-Pro LCDs", IDW '07, p. 1749, 2007.2.

The depolarization (a loss of polarization) may occur due to refraction, scattering, diffraction, reflection or the like of light passing through a constituent member such as a circuit which is provided on a substrate or in the vicinity thereof.

Also, in a liquid crystal layer with a plurality of alignment in divided minimum domains, as found in an MVA mode or PVA mode having homogenous viewing-angle properties, the depolarization of polarized light (a loss of polarization) may occur in the boundary of the domains.

Furthermore, in glass substrates, color filters, optical films, and the like as constituent members which are considered to be ideally uniform, the depolarization may slightly occur due to defects or un-uniformity of the surface shape or the inside.

In not only the constituent members as a single body but also combinations of the respective constituent members, the measured D.I. may vary depending upon an interface state thereof.

Incidentally, in the invention, unless the constituent member is specified and expressed, the D.I. is a value of the entire configuration interposed by polarizing plates.

(Retardation, Re and Rth)

In this description, $Re(\lambda)$ and $Rth(\lambda)$ are retardation (nm) in plane and retardation (nm) along the thickness direction, respectively, at a wavelength of $\lambda$. $Re(\lambda)$ is measured by applying light having a wavelength of $\lambda$ nm to a film in the normal direction of the film, using KOBRA 21ADH or WR (by Oji Scientific Instruments).

When a film to be analyzed is expressed by a monoaxial or biaxial index ellipsoid, $Rth(\lambda)$ of the film is calculated as follows.

$Rth(\lambda)$ is calculated by KOBRA 21ADH or WR based on six $Re(\lambda)$ values which are measured for incoming light of a wavelength $\lambda$ nm in six directions which are decided by a 10° step rotation from 0° to 50° with respect to the normal direction of a sample film using an in-plane slow axis, which is decided by KOBRA 21ADH, as an inclination axis (a rotation axis; defined in an arbitrary in-plane direction if the film has no slow axis in plane); a value of hypothetical mean refractive index; and a value entered as a thickness value of the film.

In the above, when the film to be analyzed has a direction in which the retardation value is zero at a certain inclination angle, around the in-plane slow axis from the normal direction as the rotation axis, then the retardation value at the inclination angle larger than the inclination angle to give a zero retardation is changed to negative data, and then the $Rth(\lambda)$ of the film is calculated by KOBRA 21ADH or WR.

Around the slow axis as the inclination angle (rotation angle) of the film (when the film does not have a slow axis, then its rotation axis may be in any in-plane direction of the film), the retardation values are measured in any desired inclined two directions, and based on the data, and the estimated value of the mean refractive index and the inputted film thickness value, Rth may be calculated according to the following formulae (X) and (XI):

$$Re(\theta) = \left[nx - \frac{ny \times nz}{\sqrt{\left\{ny \sin\left(\sin^{-1}\left(\frac{\sin(-\theta)}{nx}\right)\right)\right\}^2 + \left\{nz \cos\left(\sin^{-1}\left(\frac{\sin(-\theta)}{nx}\right)\right)\right\}^2}}\right] \times \frac{d}{\cos\left\{\sin^{-1}\left(\frac{\sin(-\theta)}{nx}\right)\right\}} \quad (X)$$

$$Rth = \left(\frac{nx + ny}{2} - nz\right) \times d \quad (XI)$$

$Re(\theta)$ represents a retardation value in the direction inclined by an angle $\theta$ from the normal direction; nx represents a refractive index in the in-plane slow axis direction; ny represents a refractive index in the in-plane direction perpendicular to nx; and nz represents a refractive index in the direction perpendicular to nx and ny. And "d" is a thickness of the film.

When the film to be analyzed is not expressed by a monoaxial or biaxial index ellipsoid, or that is, when the film does not have an optical axis, then $Rth(\lambda)$ of the film may be calculated as follows:

$Re(\lambda)$ of the film is measured around the slow axis (judged by KOBRA 21ADH or WR) as the in-plane inclination axis (rotation axis), relative to the normal direction of the film from −50 degrees up to +50 degrees at intervals of 10 degrees, in 11 points in all with a light having a wavelength of nm applied in the inclined direction; and based on the thus-measured retardation values, the estimated value of the mean refractive index and the inputted film thickness value, $Rth(\lambda)$ of the film may be calculated by KOBRA 21ADH or WR.

KOBRA 21ADH or WR calculates nx, ny and nz, upon enter of the hypothetical values of these mean refractive indices and the film thickness. On the basis of thus-calculated nx, ny and nz, $Nz=(nx-nz)/(nx-ny)$ is further calculated.

Also, in this specification, any values of $Re(\lambda)$ and $Rth(\lambda)$ such as Re(450), Re(550), Re(630), Rth(450), Rth(550), and Rth(630) are calculated on the basis of the values obtained by measuring Re and Rth at three or more different wavelengths (for example, $\lambda$=479.2, 546.3, 632.8, and 745.3 nm, etc.), respectively. Specifically, the obtained measured values are approximated by the Cauchy's formula (to the third term, $Re=A+B/\lambda2+C/\lambda4$), and then, the values of A, B and C are calculated, respectively. The values of Re and Rth are re-plotted versus the wavelength $\lambda$, respectively, and then, $Re(\lambda)$ and $Rth(\lambda)$ at each wavelength $\lambda$ can be determined from the plot.

In this specification, the "slow axis" of the retardation film and the like means the direction in which the refractive index is the largest. The "visible light region" is from 380 nm to 780 nm. Also, in this specification, unless otherwise specifically indicated, the measuring wavelength is 550 nm.

Also, in this specification, it should be construed that the numerical data, the numerical range, and the qualitative expression (for example, expression of "same", "equal", etc.) indicating the optical properties of the constitutive members such as the retardation region, the retardation film, the liquid crystal layer and others are the numerical data, the numerical range, and the qualitative properties including generally tolerable errors regarding the liquid crystal display device and the constituent members thereof.

Also, in this specification, the term "front" means the normal line direction relative to the display panel; and the "front contrast ratio (CR)" means the contrast ratio calculated on the basis of brightness in the white state and brightness in the black state which are measured in the normal line direction to the display panel.

The "viewing angle contrast ratio (CR)" means the contrast ratio calculated on the basis of brightness in the white state and brightness in the black state which are measured in the oblique direction relative to the normal line direction (for example, the direction with a polar angle of 60° relative to the display plane).

(Internal Haze)

A total haze (H), an internal haze (Hi), and a surface haze (Hs) of a film are measured in the following measurements.

(1) The total haze (H) of a film is measured using a haze meter NDH2000 (manufactured by Nippon Denshoku Industries Co., Ltd.) in conformity with JIS K-7136.

(2) Some drops of a liquid paraffin is added onto the front and rear surfaces of the film and interposed by two glass plates (Micro Slide Glass Product No. S, manufactured by Mataunami K.K.) having a thickness of 1 mm from the front and rear surfaces. The two glass plates and the film were completely brought into optically intimate contact with each other. In a state in which the surface haze was eliminated, a haze is measured, from which a haze as measured by interposing only the liquid paraffin between the two glass plates is then subtracted. The resulting value is calculated as the internal haze (Hi) of the film.

(3) A value obtained by subtracting the internal haze (Hi) calculated in the above (2) from the total haze (H) measured in the above (1) is calculated as the surface haze (Hs) of the film.

The invention is hereunder described in detail.

An embodiment of the liquid crystal display device of the invention has a liquid crystal cell containing a liquid crystal layer disposed between a pair of opposing substrates on at least one of which is provided with an electrode, and the embodiment is constituted by disposing this liquid crystal cell between two polarizing plates. Furthermore, if desired, accompanying functional layers such as a protective film of a polarizing plate, an optical compensatory member for achieving optical compensation, and an adhesive layer are provided.

<Liquid Crystal Cell>

Various constitutions have been proposed for driving modes which are used for liquid crystal display devices. The embodiment of the invention employing any driving mode may bring about the effect, and especially, the embodiment of the invention employing a vertically aligned mode brings about the preferable effect in terms of the depolarization.

D.I. of each of the members constituting a liquid crystal display device affects D.I. as the whole of liquid crystal display device. For example, the result of dividing the depolarization property into each of those of the liquid crystal layer, the color filter, the polarizing plate or the electronic substrate in a liquid crystal display device employing an IPS mode (homogenous alignment) is described in Y. Utsumi, et al.: "Reduced Light Scattering Intensity from Liquid Crystal for Higher Contrast Ratio in IPS-Pro LCDs", IDW '07, p. 1749, 2007.2. Also, the angle dependency of scattering intensity of a homeotropic alignment-liquid crystal or a homogenous alignment-liquid crystal is described in "Depolarized light scattering from liquid crystals as a factor for black level light leakage in liquid-crystal displays", JOURNAL OF APPLIED PHYSICS, 98, 016106, 2005. From the description, it is understandable that although the homogenous alignment-liquid crystal exhibits the smaller scattering intensity in the front direction as compared with the homeotropic alignment-liquid crystal, the homogenous alignment-liquid crystal exhibits the larger scattering intensity in the oblique direction as compared with the homeotropic alignment-liquid crystal.

For that reason, a liquid crystal display device employing a vertically aligned mode may have the high D.I. in the oblique direction although it has the low D.I. and the high contrast in the front direction. For improving the displaying quality, reducing the D.I. and increasing the contrast in the oblique direction, especially in the oblique direction along the horizontal direction along which the displaying surface may often be observed, are necessary.

In order to reduce the D.I. of the liquid crystal display device employing a vertically aligned mode, it is important to reduce the D.I. of each of members constituting the display device including a color filter, a liquid crystal cell including a liquid crystal layer and an optical film. For example, in order to reduce the D.I. of a circuit pattern provided on the substrate, reducing a scattering component, for example, increasing an aperture ratio, may be considered.

As the method for reducing the D.I. of an IPS-mode liquid crystal layer, reducing a scattering factor Sk is effective. In Y. Utsumi, et al.: "Reduced Light Scattering Intensity from Liquid Crystal for Higher Contrast Ratio in IPS-Pro LCDs", IDW '07, p. 1749, 2007.2., it is described that an increase of elastic constant of liquid crystal, a reduction of refractive index anisotropy of liquid crystal, a reduction of refractive index of liquid crystal, and a reduction of cell thickness of liquid crystal layer are effective for reducing Sk. The same may be also applied to a VA-mode liquid crystal display device.

<Polarizing Plate>

Next, the polarizing plate is described.

As well as a polarizing plate used in a conventional liquid crystal display device, the polarizing plate to be used in the invention may have a polarizing film and two transparent protective films disposed on the surfaces thereof respectively. In the invention, the optical film according to the invention is used as the protective film of the two protective films, which is disposed on the liquid crystal side.

As the polarizing film, a film obtained by adsorbing and aligning iodine on a polymer film is preferably used. The polymer film is not particularly limited, and various polymer films can be used. Examples thereof include a polyvinyl alcohol based film, a polyethylene terephthalate based film, an ethylene/vinyl acetate copolymer based film, and a partially saponified film thereof, a hydrophilic polymer film such as a cellulose based film, and a polyene based aligned film such as a dehydration product of polyvinyl alcohol or a dehydrochlorination product of polyvinyl chloride. Of these, a polyvinyl alcohol based film having excellent dyeability with iodine is preferably used as the polarizing film.

For a material of the polyvinyl alcohol based film, polyvinyl alcohol or a derivative thereof is used. Examples of the polyvinyl alcohol derivative include polyvinyl formal and polyvinyl acetal, and besides, those obtained by modifying polyvinyl alcohol with an olefin such as ethylene and propylene, an unsaturated carboxylic acid such as acrylic acid, methacrylic acid, and crotonic acid, or an alkyl ester thereof, acrylamide, etc.

A degree of polymerization of the polymer that is the material of the polymer film is generally in the range of from 500 to 10,000, preferably in the range of 100 to 6,000, and more preferably in the range of from 1,400 to 4,000. Furthermore, in the case of a saponified film, for example, in terms of solubility in water, its degree of saponification is preferably 75% by mole or more, more preferably 98% by mole or more, and still more preferably in the range of from 98.3 to 99.8% by mole.

The polymer film (unstretched film) is at least subjected to a uniaxial stretching treatment and an iodine dyeing treatment according to the usual way. Furthermore, the polymer film can be subjected to a boric acid treatment and a washing treatment. Also, the thus treated polymer film (stretched film) is dried according to the usual way, thereby forming a polarizing film.

The stretching method in the uniaxial stretching treatment is not particularly limited, and any of a wet stretching method and a dry stretching method can be adopted. Examples of stretching means of the dry stretching method include a roll-to-roll stretching method, a heat roll stretching method, and a compression stretching method. The stretching may be performed in multiple stages. In the stretching means, the unstretched film is usually under a heated state. Though a stretch ratio of the stretching film may be properly set depending upon the purpose, it is desirable to set up the stretch ratio (total stretch ratio) to from about 2 to 8 times, preferably from 3 to 7 times, and more preferably from 3.5 to 6.5 times.

The iodine dyeing treatment is, for example, performed by dipping the polymer film in an iodine solution containing iodine and potassium iodide. The iodine solution is usually an iodine aqueous solution and contains iodine and potassium iodide as a dissolution aid. An iodine concentration is from about 0.01 to 1% by mass, and preferably from 0.02 to 0.5% by mass; and a potassium iodide concentration is from about 0.01 to 10% by mass, and preferably from 0.02 to 8% by mass.

In the iodine dyeing treatment, a temperature of the iodine solution is usually from about 20 to 50 degrees Celsius, and preferably from 25 to 40 degrees Celsius. A dipping time is usually from about 10 to 300 seconds, and preferably in the range of from 20 to 240 seconds. In the iodine dyeing treatment, the polymer film is adjusted such that the iodine content and the potassium content fall the foregoing ranges, by adjusting conditions such as the concentration of the iodine solution, the dipping temperature of the polymer film in the iodine solution, and the dipping time. The iodine dyeing treatment may be performed in any stage before the uniaxial stretching treatment, during the uniaxial stretching treatment, or after the uniaxial stretching treatment.

Taking the optical properties into consideration, the iodine content of the polarizing film is, for example, in the range of from 2 to 5% by mass, and preferably in the range of from 2 to 4% by mass.

Preferably, the polarizing film contains potassium. A potassium content is preferably in the range of from 0.2 to 0.9% by mass, and more preferably in the range of from 0.5 to 0.8% by mass. By allowing the polarizing film to contain potassium, a polarizing film having a preferred composite elastic modulus (Er) and a high degree of polarization can be obtained. For example, by dipping the polymer film that is a polarizing film forming material in a potassium-containing solution, it is possible to contain potassium. The foregoing solution may also work as the iodine-containing solution.

As the drying treatment step, conventionally known drying methods such as natural drying, ventilation drying, and heat drying may be adopted. For example, in the heat drying, a heating temperature is from about 20 to 80 degrees Celsius, and a drying time is from about 1 to 10 minutes. Also, in this drying treatment step, stretching may also be properly achieved.

A thickness of the polarizing film is not particularly limited, and it is usually from 5 to 300 micro meters, preferably from 10 to 200 micro meters, and more preferably from 20 to 100 micro meters.

<Protective Film of Polarizing Plate and Optically Compensatory Film>

Of the foregoing protective films, as the protective film to be disposed on the opposite side to the liquid crystal cell, thermoplastic resins which are excellent in transparency, mechanical strength, heat stability, moisture-blocking properties, isotropy, etc. are used. Specific examples of such a thermoplastic resin include cellulose resins such as triacetyl cellulose, polyester resins, polyethersulfone resins, polysulfone resins, polycarbonate resins, polyamide resins, polyimide resins, polyolefin resins, (meth)acrylic resins, cyclic polyolefin resins (e.g., norbornene based resins), polyarylate resins, polystyrene resins, polyvinyl alcohol resins, and mixtures thereof.

The cellulose resin is an ester of cellulose and a fatty acid. Specific examples of such a cellulose ester based resin include triacetyl cellulose, diacetyl cellulose, tripropyl cellulose, and dipropyl cellulose. Of these, triacetyl cellulose is especially preferable. As to triacetyl cellulose, a lot of products are commercially available, and these materials are advantageous in terms of easiness of availability and costs. Examples of marketed products of triacetyl cellulose include "UV-50", "UV-80", "SH-80", "TD-80U", "TD-TAC", and "UZ-TAC", all of which are a trade name, manufactured by Fujifilm Corporation; and "KC Series", manufactured by Konica Minolta Holdings, Inc.

Specifically, the cyclic polyolefin resin is preferably a norbornene based resin. The cyclic olefin based resin is a generic name of resins obtained by polymerizing a cyclic olefin as a polymerization unit, and examples thereof include resins described in JP-A-1-240517, JP-A-3-14882, JP-A-3-122137, etc. Specific examples thereof include ring-opened (co)copolymers of a cyclic olefin; addition polymers of a cyclic olefin; a cyclic olefin, an α-olefin such as ethylene and propylene, and copolymers thereof (typically, random copolymers); graft polymers wherein these are modified with an unsaturated carboxylic acid or a derivative thereof; and hydrogenated products thereof. A specific example of the cyclic olefin is a norbornene based monomer.

As to the cyclic polyolefin resin, various products are commercially available. Specific examples thereof include "ZEONEX" and "ZEONOR", all of which a trade name, manufactured by Zeon Corporation; "ARTON" which a trade name, manufactured by JSR Corporation; "TOPAS", which is a trade name, manufactured by Ticona GmbH; and "APEL", which is a trade name, manufactured by Mitsui Chemicals, Inc.

As the (meth)acrylic resin, an arbitrary appropriate (meth) acrylic resin may be adopted within the range where the effects of the invention are not impaired. Examples thereof include a poly(meth)acrylate such as polymethyl methacrylate; a methyl methacrylate-(meth)acrylic acid copolymer, a methyl methacrylate-(meth)acrylate copolymer, a methyl methacrylate-acrylate-(meth)acrylic acid copolymer, a methyl (meth)acrylate-styrene copolymer (an MS resin, etc.), and a polymer having an alicyclic hydrocarbon group (for example, a methyl methacrylate-cyclohexyl methacrylate copolymer, a methyl methacrylate-norbornyl (meth)acrylate copolymer, etc.). Preferably, there are exemplified C1-6 alkyl poly(meth)acrylates such as polymethyl (meth)acrylate. More preferably, there are exemplified methyl methacrylate based resins containing methyl methacrylate as a main component (in a proportion of from 50 to 100% by mass, and preferably from 70 to 100% by mass).

Specific examples of the (meth)acrylic resin include ACRYPET VH and ACRYPET VRL20A, all of which are a trade name, manufactured by Mitsubishi Rayon Co., Ltd.; (meth)acrylic resins having a ring structure in the molecule thereof, as described in JP-A-2004-70296; and high-Tg (meth)acrylic resin systems obtained by intramolecular crosslinking or intramolecular cyclization reaction.

Lactone ring structure-containing (meth)acrylic resins can also be used as the (meth)acrylic resin. This is because they have high heat resistance and high transparency and also have high mechanical strength upon biaxial stretching.

A thickness of the protective film may be properly decided, and is in general from about 1 to 500 micro meters in terms of strength, workability such as handling properties, and thin layer properties. In particular, the thickness of the protective film is preferably from 1 to 300 micro meters, and more preferably from 5 to 200 micro meters. The protective film having a thickness of from 5 to 150 micro meters is especially suitable.

<Adhesive Layer>

In boding the polarizing film and the protective film to each other, an adhesive or a pressure-sensitive adhesive, or the like may be properly adopted depending upon the polarizing film and the protective film. The adhesive and the adhesive treatment method are not particularly limited, and the bonding may be, for example, performed via an adhesive composed of a vinyl polymer, or an adhesive composed of at least a water-soluble crosslinking agent of a vinyl alcohol based polymer, such as boric acid, borax, glutaraldehyde, melamine, and oxalic acid. The adhesive layer of such an adhesive may be formed by coating and drying an aqueous solution thereof, and in preparing the aqueous solution, a crosslinking agent or other additives, or a catalyst such as an acid may also be blended, if desired. In particular, in the case of using a polyvinyl alcohol based polymer film as the polarizing film, in terms of adhesiveness, it is preferable to use an adhesive containing a polyvinyl alcohol based resin. Furthermore, in terms of enhancing the durability, an adhesive containing a polyvinyl alcohol based resin having an acetoacetyl group is more preferable.

The polyvinyl alcohol based resin is not particularly limited, and in terms of adhesiveness, the polyvinyl alcohol based resin having an averaged degree of polymerization of from about 100 to 3,000 and an averaged degree of saponification of from 85 to 100% by mole is preferable. Also, a concentration of the adhesive aqueous solution is not particularly limited, and is preferably from 0.1 to 15% by mass, or more preferably from 0.5 to 10% by mass. A thickness after drying of the adhesive layer is preferably from about 30 to 1,000 nm, or more preferably from 50 to 300 nm. When the layer is too thin, the adhesive force becomes insufficient, whereas when the layer is too thick, the probability of generation of a problem regarding the appearance becomes high.

As other adhesives, (meth)acrylic, urethane based, acrylic urethane based, epoxy based, or silicone based thermosetting resins or ultraviolet ray-curable resins may be used.

As to the optical properties of the polarizing film, a single transmittance as measured as the polarizing film alone is preferably equal to or more than 43%, or more preferably from 43.3 to 45.0%. A crossed transmittance is measured for a lamination prepared by stacking two polarizing films so that their absorption axes are orthogonal to each other, and the smaller crossed transmittance is more preferable, and from the standpoint of practical use, the crossed transmittance is preferably equal to or more than 0.00% and equal to or less than 0.050%, or more preferably equal to or less than 0.030%. From the standpoint of practical use, a degree of polarization is preferably equal to or more than 99.90% and not more than 100%, or especially preferably equal to or more than 99.93% and not more than 100%. The polarizing plate exhibiting substantially the same optical properties as those of the polarizing film is preferable.

According to the embodiment of the invention having the above-described constitution, it is preferable that the hue observed in any direction is neutral in the black state. One preferable embodiment exhibits a hue in the black state observed in the front direction close to a neutral hue. For that reason, $V'_{on\ axis}$ is preferably from 0.35 to 0.55, more preferably from 0.37 to 0.53, or especially preferably from 0.39 to 0.51.

Also, in order to obtain the favorable hue also in any oblique directions other than the front direction, a difference between the hues observed in the front direction and in the oblique directions, which is expressed below:

$$\Delta u'v'_{ave\text{-}on\ axis} = \sqrt{(u'_{ave} - u'_{onaxis})^2 + (v'_{ave} - v'_{onaxis})^2}$$

is preferably adjusted to 0.04 or smaller. Furthermore, this difference is more preferably adjusted to not more than 0.03, or especially preferably to not more than 0.02. A liquid crystal display device, exhibiting a small $\Delta u'v'_{ave\text{-}on\ axis}$, has the excellent displaying-quality because the hue observed in the oblique direction is close to that observed in the front direction.

Furthermore, considering hues observed along a same oblique direction, the difference among the hues observed in the directions with a fixed polar angle (for example, 60°) and an azimuth angle ranging from 0 to 360°), which is expressed below:

$$\Delta u'v'_{60°} = \sqrt{(u'_{max} - u'_{min})^2 + (v'_{max} - v'_{min})^2}$$

is preferably adjusted to 0.04 or smaller. Furthermore, this difference is adjusted to more preferably not more than 0.03, or especially preferably not more than 0.02. The smaller $\Delta u'v'_{60°}$ is more preferable since the hue variation observed in any oblique directions may become smaller.

Furthermore, the embodiment wherein $\Delta u'v'_{ave\text{-}on\_axis}$ and $\Delta u'v'_{60°}$ satisfy the following relation:

$$\Delta u'v'_{ave\text{-}on\_axis} < \Delta u'v'_{60°}$$

is especially preferable since the difference between the hues in the front direction and in the oblique direction and the difference among the hues in any oblique directions are adjusted to small, and the difference among the hues in all directions is hardly recognized.

Adjusting Re or Rth of the optical film to be used for performing an optical compensation is exemplified as the means for reducing the difference of the hue in the oblique direction. In this embodiment, for obtaining the preferable effect, preferably, Re and Rth satisfy relations of 20 nm≤Re≤100 nm and 70 nm≤Rth≤300 nm, respectively; more preferably, Re and Rth satisfy relations of 30 nm≤Re≤90 nm and 80 nm≤Rth≤280 nm respectively; or even more preferably, Re and Rth satisfy relations of 40 nm≤Re≤80 nm and 90 nm≤Rth≤260 nm respectively.

Furthermore, preferably, the optical film to be used in the invention exhibits the wavelength dispersion characteristics satisfying the following relations relative to the wavelength of light passing through the film.

$$0.75 \le Re(450)/Re(550) \le 1.00$$

$$1.00 \le Re(650)/Re(550) \le 1.25$$

By adjusting the wavelength dispersion characteristics to the foregoing ranges, a liquid crystal display device having an increased viewing angle CR and excellent display quality may be obtained.

As other means, using a polarizing plate having the hue satisfying the following relations is preferable.

$$0.16 \le u'_{pol} \le 0.24 \quad (5)$$

$$0.38 \le v'_{pol} \le 0.50 \quad (6)$$

Furthermore, by adjusting a crossed transmittance Tc(410) of the polarizing plate at a wavelength of 410 nm to not more than 0.03%, it is possible to obtain an effect of improving the display quality.

Incidentally, the hue ranges of the polarizing plate are more preferably $0.17 \le u'_{pol} \le 0.23$ and $0.40 \le v'_{pol} \le 0.50$; and especially preferably $0.18 \le u'_{pol} \le 0.22$ and $0.43 \le v'_{pol} \le 5\ 0.50$. When a polarizing plate whose hue falls within the foregoing range is used, the hue of a liquid crystal display device in the black state observed in the front direction may become neutral, and the hue variation in the oblique direction may become small; and therefore, a polarizing plate whose hue in an orthogonal state satisfies the above-described ranges is preferably used. By optimizing mainly the conditions for preparing a polarizing film, such as a stretch ratio, a concentration of each ingredient in a dyeing solution, a temperature/a time in dyeing, a temperature/a time in drying after dyeing, and a temperature/a time after adhesion, it is possible to achieve the hue of the polarizing plate satisfying the foregoing ranges.

Also, the Tc(410) is more preferably equal to or less than 0.015%, or still more preferably equal to or less than 0.003%. A polarizing plate whose Tc(410) is small may be preferably used since by using the polarizing plate in the liquid crystal display device, the liquid crystal display device may be improved in terms of not only the neutral hue but also the resistance to a wet heat test.

In order to improve the display quality regardless of the direction along which the display device is observed, it is necessary to not only control the hue but also achieve a high contrast in the oblique direction. For that reason, it is necessary that the light passing through a polarizer keeps the polarization until reaching an analyzer. That is, it is necessary that depolarization properties (D.I.) generated in each member constituting the liquid crystal display and an interface between the members are made small, thereby suppressing the depolarization. If trying to improve the contrast by suppressing the depolarization, lights having various wavelengths may overlap one another after being subjected to a suppression of the depolarization, and therefore, the hue variation of the display may be relatively small. On the other hand, if trying to improve the contrast by making D.I. small, the effect brought about by overlapping of the lights subjected to suppressing the depolarization may be reduced, which may result in making the hue variation more recognizable.

Accordingly, in order to improve the displaying quality in all directions of the liquid crystal display, it is important to not only optimize the foregoing constituent members so as to reduce the hue variation but also reduce the D.I. values of the liquid crystal display device, especially the liquid crystal cell, in the front direction and in the oblique direction (for example, in the oblique direction along a horizontal direction) so as to achieve a high contrast.

D.I.(0°) is a depolarization property of a liquid crystal cell having an optical film on the both surfaces thereof respectively, observed in the normal direction; and) D.I.(30°) is a depolarization property of a liquid crystal cell having an optical film on the both surfaces thereof respectively, observed in the direction of 30° along a horizontal direction. And they preferably satisfy a relation of D.I.(30°)/D.I.(0°) <4.0, more preferably satisfy a relation of D.I.(30°)/D.I.(0°) <3.0, or even more preferably satisfy a relation of D.I.(30°)/D.I.(0°)<2.5. The smaller value of "D.I.(30°)/D.I.(0°)" is more preferable because the difference between the front CR and the horizontal CR may become small and a favorable display quality may be kept regardless of the direction of observation.

D.I.(0°), which is the depolarization property of the liquid crystal cell having an optical film on the both surfaces respectively (which may be a constituting member disposed between a polarizer and an analyzer of a liquid crystal display device) observed in the front direction, is preferably equal to or less than 0.04%, more preferably equal to or less than 0.03%, or even more preferably equal to or less than 0.02%. Using the liquid crystal cell having the smaller D.I.(0°) may result in more improving the contrast.

D.I.(0°) is a depolarization property of a liquid crystal cell alone observed in the normal direction; and D.I.(30°) is a depolarization property of a liquid crystal cell alone observed in the direction of 30° along a horizontal direction. And they preferably satisfy a relation of D.I.(30°)/D.I.(0°)<4.0, more preferably satisfy a relation of D.I.(30°)/D.I.(0°)<3.0, or even more preferably satisfy a relation of D.I.(30°)/D.I.(0°)<2.5. The smaller value of "D.I.(30°)/D.I.(0°)" is more preferable because the difference between the front CR and the horizontal CR may become small and a favorable display quality may be kept regardless of the direction of observation.

D.I.(0°), which is the depolarization property of the liquid crystal cell alone observed in the front direction, is preferably equal to or less than 0.04%, more preferably equal to or less than 0.03%, or even more preferably equal to or less than 0.02%. Using the liquid crystal cell having the smaller D.I.(0°) may result in more improving the contrast.

The internal haze of the transparent support (especially the optical film for optical compensation) to be used in the invention is preferably not more than 0.05%, more preferably not more than 0.04%, or still more preferably not more than 0.03%. In order to reduce the D.I. of the optical film, it is effective to reduce the haze. The haze of a film is classified into a surface haze caused by scattering dues to irregularities of the surface, etc. and into an internal haze caused by internal scattering, etc. When used for a liquid crystal display device, since the film surface comes into contact with an adhesive or a pressure-sensitive adhesive, each having a refractive index close to the refractive index of the optical film, the surface haze does not substantially contribute to the D.I. of the liquid crystal display device, it is effective to reduce the internal haze.

As described above, by combining the respective constituent members having above-described properties, it is possible to provide a liquid crystal display device exhibiting high displaying qualities regardless of the direction along which the display is observed.

FIG. 1 is a cross-sectional schematic view of an example of a liquid crystal display device of the present invention. The liquid crystal display device shown in FIG. 1 comprises a liquid crystal cell 10, a pair of polarizing plates 12 and 12b disposed on the outer sides of the liquid crystal cell 10 respectively of which absorption axes are orthogonal to each other, and optical films 14a and 14b disposed between each of the pair of polarizing plates 12a and 12b and the liquid crystal cell 10.

One embodiment of the liquid crystal display device of the invention is a liquid crystal display device employing a VA-mode liquid display device. The mode may be an MVA-mode or PVA-mode. One preferable embodiment of the liquid crystal display device employing an MVA-mode or PVA-mode is a liquid crystal display device comprising:

a liquid crystal cell and a polarizing plate disposed on at least one of the outer sides of the liquid crystal cell, wherein the liquid crystal cell comprises:

a pair of substrates disposed facing with each other, one of which is provided with an electrode, a liquid crystal layer disposed between the substrates which comprises three pixel regions, first, second and third pixel regions, and color filters, disposed on the first, second and third pixel regions respectively, having wavelength selectivity on transmittance and having a maximum transmittance at a main wavelength of $\lambda 1$, $\lambda 2$ and $\lambda 3$ (unit: nm) respectively, which satisfies a relation $\lambda 1 < \lambda 2 < \lambda 3$; and a thickness of the liquid crystal layer, d1, d2, and d3 (unit: nm), corresponding to the first, second and third pixel regions respectively satisfy following relation (11), or more preferably satisfy following relation (12).

$$d2 < d3 \quad (11).$$

$$d1 < d2 < d3 \quad (12)$$

EXAMPLES

The present invention is hereunder more specifically described by reference to Examples. Materials, reagents, proportions, operations, and so on shown in the following Examples can be properly changed so far as the spirit of the invention is not deviated. In consequence, it should not be construed that the scope of the invention is limited to the following specific examples.

<Preparation of Optical Film>

[Preparation of Optical Film 103]

Respective ingredients were mixed in a proportion shown in the following table, thereby preparing a cellulose acrylate solution. The cellulose acylate solution was cast using a band casting machine, and the obtained web was separated from the band and then stretched under a condition. After stretching, drying was performed to prepare a cellulose acylate based film in the following table. The resulting film was used as Optical Film 103.

An optical film same as Example 9 described in JP-A-2010-58331 was used as Optical Film 101.

"TD-80U", manufactured by Fujifilm Corporation was used as Optical Film 102.

Results obtained by measuring each of the films for Re, Rth, wavelength dispersion, and internal haze are shown in Table 1.

TABLE 1

|  | Optical Film No. | | |
|---|---|---|---|
|  | 101 | 102 | 103 |
| Re [nm] | 48 | 0 | 48 |
| Rth [nm] | 118 | 50 | 118 |
| Re(450)/Re(550) | 0.95 | 0.9 | 1.04 |
| Re(650)/Re(550) | 1.02 | 1.03 | 0.98 |
| Internal haze [%] | 0.01 | 0.04 | 0.09 |

<Preparation of Polarizing Plate>

A concentration of each ingredient in a dyeing solution, a temperature/a time in dyeing, a temperature/a time in drying after dyeing, a temperature/a time I drying after adhesion, and the like were adjusted, thereby preparing each of polarizing plates shown in the following table. The used optical film and results obtained by evaluating hue and transmittance are shown in the following table.

TABLE 2

|  | Polarizing Plate No. | | | | |
|---|---|---|---|---|---|
|  | 101 | 102 | 103 | 104 | 105 |
| Optical Film No. | 101 | 102 | 103 | 102 | 101 |
| u' | 0.20 | 0.20 | 0.20 | 0.19 | 0.19 |
| v' | 0.45 | 0.45 | 0.45 | 0.30 | 0.22 |
| Tc(410) [%] | 0.003 | 0.003 | 0.003 | 0.020 | 0.035 |

<Fabrication and Evaluation of VA-Mode Liquid Crystal Display Device>

Preparation of VA-mode Liquid Crystal Cell:

After washing a glass substrate having a transparent electrode (ITO) structure shown in FIG. 1, a vertically aligned film (a polyimide resin JALS684, manufactured by JSR Corporation) was spin coated and baked by prebaking on a hot plate at 80 degrees Celsius for 3 minutes and post-baking in an oven at 180 degrees Celsius for one hour, thereby forming substrates A and B having a vertically aligned film formed thereon. A polymer sphere (MICROPEARL, manufactured by Sekisui Chemical Co., Ltd., 3.0 micro meters) was sprayed as a spacer for controlling the cell thickness on one of the substrates; a sealing agent (manufactured by ThreeBond Co., Ltd.) was formed on the other substrate; alignment was performed such that electrode slits of the substrates A and B were mutually disposed, thereby achieving sealing, followed by a thermal treatment (at 135 degrees Celsius for 90 minutes) to form a blank liquid crystal cell. Subsequently, a liquid crystal having negative dielectric anisotropy, for example, MLC-7026-100 ($\Delta n=0.1091$ at a wavelength of 589.3 nm, $\Delta\in=-3.9$), which is a liquid crystal, manufactured by Merck Japan K.K., was injected into the liquid crystal cell by means of vacuum injection, thereby forming a liquid crystal cell ($\Delta nd=327$ nm). According to such a configuration, a thickness d of the liquid crystal layer can be controlled by the size of the spacer sphere of the polymer. Also, by using a pillar-shaped spacer pattern (diameter: 16 micro meters, average height: 3.0 micro meters) formed in a portion corresponding to an upper part of a diaphragm on the ITO film by a photosensitive resin in place of the foregoing polymer sphere, A PVA panel having more improved CR could be realized.

A polarizing plate (configuration: surface protective film TAC/PVA polarizing layer/retardation film/pressure-sensitive adhesive) was disposed on the both surfaces of the above-fabricated liquid crystal cell such that the absorption axes were orthogonal to each other, thereby forming a liquid crystal panel of a VA mode. By disposing the liquid crystal panel on a BL light source (CCFL or LED) and applying a voltage (rectangular wave) to the ITO electrode, a transmittance (brightness) can be controlled by the voltage from black display (the liquid crystal molecule is substantially vertically aligned at a voltage of 0 V) to white display (the liquid crystal molecule is obliquely aligned in four directions in the parallel direction to the substrate surface at a voltage of 5 V). Also, following a decrease of the thickness d of the liquid crystal layer, the response speed increases; and following a decrease of Δnd of the liquid crystal layer, while a viewing angle range where the contrast ratio is 10 or more is enlarged, the transmittance decreases. For that reason, it is preferable to set up the retardation Δnd of the liquid crystal layer such that it falls within the range of from about 150 nm to about 400 nm. The range of Δnd of from about 250 nm to about 360 nm is a more preferred condition.

(Fabrication of PVA Liquid Crystal Panel)

In the invention, a VA-mode liquid crystal panel having a PVA structure (which can be manufactured by the technology disclosed in JP-A-2006-201771), which is used in a liquid crystal panel "KDL-40V5", manufactured by Sony Corporation, can be used.

As a specific manufacturing method, a TFT element was fabricated on one glass substrate according to Example 20 described in JP-A-2009-141341, and a protective film was further formed on the TFT element. Subsequently, a contact hole was formed on the protective film, and thereafter, a transparent electrode of ITO electrically connected to the TFT element was formed on the protective film, thereby fabricating an array substrate.

On the other glass substrate, compositions described in Examples 3, 8 and 10 of JP-A-2009-144126 were prepared, respectively as colored photosensitive compositions, and color filter substrates were fabricated according to the process described in Example 9a in paragraphs [0099] to [0103] of JP-T-2008-516262 by using these compositions.

However, the concentration of the pigment in the colored photosensitive resin composition of each pixel was halved, and the coating amount was adjusted such that a black pixel was 4.2 micro meters. By changing the thickness of each of blue, green and red color filters, a liquid crystal layer thickness ($d_B$) of the blue pixel, a liquid crystal layer thickness ($d_G$) of the green pixel, and a liquid crystal layer thickness ($d_R$) of the red pixel were adjusted.

On the above-fabricated color filter substrate, a transparent electrode of ITO (indium tin oxide) was formed by means of sputtering. Subsequently, a spacer was formed in a portion corresponding to an upper part of a diaphragm (black matrix) on this ITO film.

Separately, a glass substrate having a transparent electrode of ITO formed thereon was prepared as a counter substrate, the transparent electrodes of the color filter substrate and the counter substrate were subjected to patterning for a PVA mode, respectively, and a vertically aligned film made of a polyimide (or polyamic acid) was provided as an aligned film thereof by means of spin coating.

Thereafter, a sealing agent made of an ultraviolet ray-curable resin was coated at a position corresponding to a black matrix outer frame provided in the circumstance so as to surround an RGB pixel group of color filters by a dispenser system; a liquid crystal for a PVA mode with negative refractive index anisotropy was dropped; the resultant was stuck to the counter substrate; and the stuck substrate was irradiated with UV, followed by a thermal treatment to cure the sealing agent. There was thus fabricated a liquid crystal cell.

Subsequently, Δnd(590) of the fabricated liquid crystal cell was measured using AXOSCAN, manufactured by AXOMETRICS and an annexed software, and a liquid crystal cell having a Δnd(590) of 295 nm was selected and used as a COA-type PVA liquid crystal cell. There were thus prepared Liquid Crystal Cells 101 and 102.

A thickness of the liquid crystal layer of Liquid Crystal Cell 101 was 3.3 micro meters for the blue pixel ($d_B$), 3.5 micro meters for the green pixel ($d_G$), and 3.7 micro meters for the red pixel ($d_R$), respectively (that is, Liquid Crystal Cell 101 satisfied $d_B \ll d_R$).

A thickness of the liquid crystal layer of Liquid Crystal Cell 102 was 3.5 micro meters for all of the blue pixel ($d_B$), the green pixel ($d_G$), and the red pixel ($d_R$).

(Fabrication of MVA Liquid Crystal Cell)

In the invention, a VA-type liquid crystal panel having an MVA structure (which can be manufactured by the technology disclosed in Japanese Patent No. 2947350), which is used in a liquid crystal panel "LC-GX3W", manufactured by Sharp Corporation, can be used.

As a specific manufacturing method, a TFT element was fabricated on one glass substrate according to Example 20 described in JP-A-2009-141341, and a protective film was further formed on the TFT element. Subsequently, a contact hole was formed on the protective film, and thereafter, a transparent electrode of ITO electrically connected to the TFT element was formed on the protective film, thereby fabricating an array substrate. Color filters were fabricated in the same manner as that described above.

Thereafter, a sealing agent made of an ultraviolet ray-curable resin was coated at a position corresponding to a black matrix outer frame provided in the circumstance so as to surround an RGB pixel group of color filters by a dispenser system; a liquid crystal for a PVA mode was dropped; the resultant was stuck to the counter substrate; and the stuck substrate was irradiated with UV, followed by a thermal treatment to cure the sealing agent. There was thus fabricated a liquid crystal cell.

Subsequently, Δnd(590) of the fabricated liquid crystal cell was measured using AXOSCAN, manufactured by AXOMETRICS and an annexed software, and a liquid crystal cell having a Δnd(590) of 295 nm was selected and used as a COA-type PVA liquid crystal cell. There was thus prepared Liquid Crystal Cell 103.

A thickness of the liquid crystal layer of Liquid Crystal Cell 103 was 3.3 micro meters for the blue pixel ($d_B$), 3.5 micro meters for the green pixel ($d_G$), and 3.7 micro meters for the red pixel ($d_R$), respectively (that is, Liquid Crystal Cell 101 satisfied $d_B < d_B < d_R$).

Subsequently, Δnd(590) of the fabricated liquid crystal cell was measured using AXOSCAN, manufactured by AXOMETRICS and an annexed software, and a liquid crystal cell having a Δnd(590) of 295 nm was selected and used as a COA-type PVA liquid crystal cell.

<Measurement of D.I.>

Each of the fabricated liquid crystal cells was measured for D.I. at the front and the direction of 30° along the horizontal direction according to the method described in Y. Utsumi, et al., "Reduced Light Scattering Intensity from Liquid Crystal for Higher Contrast Ratio in IPS-Pro LCDs", IDW '07, p. 1749, 2007.2. The results are shown in the following table.

TABLE 3

| | Liquid Crystal Cell No. | | |
|---|---|---|---|
| | 101 | 102 | 103 |
| D.I.(30°)/D.I.(0°) | 3.0 | 3.0 | 10.0 |
| D.I.(0°) [%] | 0.02 | 0.02 | 0.05 |
| D.I.(30°) [%] | 0.06 | 0.06 | 0.5 |

Furthermore, the optical film was stuck onto the both sides of the liquid crystal cell such that the slow axes were orthogonal to each other, and then measured for D.I. The results are shown in the following table.

TABLE 4

| | Liquid Crystal Cell No. | | | | |
|---|---|---|---|---|---|
| | 101 | 101 | 101 | 102 | 103 |
| Optical Film No. | 101 | 102 | 103 | 101 | 102 |
| D.I.(30°)/D.I.(0°) | 3.0 | 3.8 | 7.5 | 3.0 | 10.0 |
| D.I.(0°) [%] | 0.025 | 0.04 | 0.04 | 0.025 | 0.05 |
| D.I.(30°) [%] | 0.075 | 0.15 | 0.3 | 0.075 | 0.5 |

On the outer surface of each of the both substrates of the fabricated liquid crystal cell, each of Polarizing Plates 101 to 105 was stuck via SK2057 (manufactured by Soken Chemical & Engineering Co., Ltd.). On that occasion, a liquid crystal display device was fabricated so that each of Optical Films 101 to 103 was disposed at the glass substrate side. A combination of the optical film, the polarizing plate, and the liquid crystal cell used for the fabrication of a liquid crystal display device is shown in the following table.

For a light source for each of Liquid Crystal Cells 101 and 102, the backlight used in the foregoing "KDL-40V5" was used, and the light source was disposed on the array substrate side.

For a light source for Liquid Crystal Cell 103, the backlight used in the foregoing "LC-GX3W" was used, and the light source was disposed on the array substrate side.

TABLE 5

| | Example | Example | Example | Example | Example | Example | Comparison | Comparison |
|---|---|---|---|---|---|---|---|---|
| Liquid Crystal Display Device No. | 101 | 102 | 103 | 104 | 105 | 106 | 201 | 202 |
| Polarizing Plate No. | 101 | 102 | 103 | 101 | 101 | 101 | 104 | 105 |
| Optical Film No. | 101 | 102 | 103 | 101 | 101 | 101 | 101 | 101 |
| Liquid Crystal Cell No. | 101 | 101 | 101 | 103 | 103 | 102 | 103 | 103 |

<Evaluation of Liquid Crystal Display Device>

Each of the fabricated liquid crystal display devices was evaluated for a brightness and a chromaticity at each of black display and white display within a dark room by using an analyzer (EZ-Contrast XL88, manufactured by ELDIM). The results are shown in the following table.

TABLE 6

| | | Example | Example | Example | Example | Example | Example | Comparison | Comparison |
|---|---|---|---|---|---|---|---|---|---|
| Liquid Crystal Display Device No. | | 101 | 102 | 103 | 104 | 105 | 106 | 201 | 202 |
| Polarizing Plate No. | | 101 | 102 | 103 | 101 | 101 | 101 | 104 | 105 |
| Optical Film No. | | 101 | 102 | 103 | 101 | 101 | 101 | 101 | 101 |
| Liquid Crystal Cell No. | | 101 | 101 | 101 | 103 | 103 | 102 | 103 | 103 |
| Evaluation results | $\Delta u'v'_{ave\text{-}on\,axis}$ | 0.01 | 0.04 | 0.01 | 0.01 | 0.01 | 0.01 | 0.07 | 0.06 |
| | $\Delta u'v'_{60°}$ | 0.02 | 0.02 | 0.02 | 0.02 | 0.02 | 0.04 | 0.04 | 0.04 |
| | $u'_{on\,axis}$ | 0.21 | 0.21 | 0.21 | 0.21 | 0.21 | 0.21 | 0.20 | 0.20 |
| | $v'_{on\,axis}$ | 0.44 | 0.44 | 0.44 | 0.44 | 0.44 | 0.44 | 0.38 | 0.37 |
| | $u'_{ave}$ | 0.20 | 0.20 | 0.20 | 0.20 | 0.20 | 0.20 | 0.20 | 0.20 |
| | $v'_{ave}$ | 0.45 | 0.40 | 0.45 | 0.45 | 0.45 | 0.45 | 0.45 | 0.43 |
| | CR(30°)/Front CR | 0.45 | 0.41 | 0.45 | 0.20 | 0.20 | 0.45 | 0.20 | 0.20 |
| | Front CR | 5300 | 5100 | 5300 | 3000 | 3000 | 5300 | 3000 | 3000 |
| | Horizontal 30° CR | 2400 | 2100 | 2400 | 600 | 600 | 2400 | 600 | 600 |

From the results shown in the foregoing table, it is understandable that the liquid crystal display devices of the invention exhibited the small color variation, high front CR and the high value of)"CR(30°)/front CR" respectively, and were excellent in the display qualities.

Also, the same effects were confirmed in the COA-type liquid crystal cell.

The COA-type liquid crystal display cell was fabricated by reference to Example 9a described in paragraphs [0099] to [0103] of JP-T-2008-516262.

So far as cells having low D.I. in the front and oblique directions were used, the effects of the invention were obtained even according to the embodiment employing a photo-alignment type VA liquid crystals and PSA.

The invention claimed is:

1. A liquid crystal display device, wherein $u'_{on\ axis}$ and $v'_{on\ axis}$, $u'_{max}$ and $v'_{max}$, and $u'_{min}$ and $v'_{min}$ satisfy following expressions (1), (2) and (3):

$$u'_{ave} = \left(\frac{u'_{max} - u'_{min}}{2}\right), v'_{ave} = \left(\frac{v'_{max} - v'_{min}}{2}\right) \quad (1)$$

$$\Delta u'v'_{ave-on\ axis} = \sqrt{(u'_{ave} - u'_{on\ axis})^2 + (v'_{ave} - v'_{on\ axis})^2} \leq 0.04 \quad (2)$$

$$0.35 \leq v'_{on\ axis} \leq 0.55 \quad (3)$$

wherein $u'_{on\ axis}$ and $v'_{on\ axis}$ are hues in a black state observed in a front direction;

$u'_{max}$ and $v'_{max}$ are maximum values of u' and v' in a black state observed in directions with an azimuth angle ranging from 0° to 360° and a polar angle of 60°; and $u'_{min}$ and $v'_{min}$ are minimum values of u' and v' in a black state observed in directions with an azimuth angle ranging from 0° to 360° and a polar angle of 60°.

2. The liquid crystal display device according to claim 1, which satisfies following expression (4):

$$\Delta u'v'_{60°} = \sqrt{(u'_{max} - u'_{min}) + (v'_{max} - v'_{min})^2} < 0.04 \quad (4).$$

3. The liquid crystal display device according to claim 1, comprising at least one polarizing plate of which hues $u'_{-pol}$ and $v'_{-pol}$ satisfy following expressions (5) and (6):

$$0.16 \leq u'_{-pol} \leq 0.24 \quad (5)$$

$$0.38 \leq v'_{-pol} \leq 0.50 \quad (6)$$

wherein the hues $u'_{-pol}$ and $v'_{-pol}$ are hues of the polarizing plate in an orthogonal state.

4. The liquid crystal display device according to claim 1, comprising at least one polarizing plate of which a crossed transmittance at a wavelength of 410 nm is equal to or less than 0.03%.

5. The liquid crystal display device according to claim 1, comprising:
a liquid crystal cell,
a pair of polarizing plates, absorption axes of which are orthogonal to each other, and
an optical film disposed between each of the pair of polarizing plates and the liquid crystal cell, wherein
D.I.(0°) and D.I.(30°) of the liquid crystal cell and the optical film satisfy following expressions (7) and (8):

$$D.I.(30°)/D.I.(0°) < 4.0 \quad (7)$$

$$D.I.(0°) < 0.04\% \quad (8)$$

where
D.I.(0°) and D.I.(30°) are values observed in a front direction and in a direction of 30° along a horizontal direction respectively.

6. The liquid crystal display device according to claim 1, comprising:
a liquid crystal cell,
a pair of polarizing plates, absorption axes of which are orthogonal to each other, and
an optical film disposed between each of the pair of polarizing plates and the liquid crystal cell, wherein
D.I.(0°) and D.I.(30°) of the liquid crystal cell satisfy following expressions (9) and (10):

$$D.I.(30°)/D.I.(0°) < 4.0 \quad (9)$$

$$D.I.(0°) < 0.03\% \quad (10)$$

where
D.I.(0°) and D.I.(30°) are values observed in a front direction and in a direction of 30° along a horizontal direction respectively.

7. The liquid crystal display device according to claim 1, comprising:
a liquid crystal cell and
a polarizing plate disposed on at least one of the outer sides of the liquid crystal cell, wherein
the liquid crystal cell comprises:
a pair of substrates disposed facing with each other, one of which is provided with an electrode,
a liquid crystal layer disposed between the substrates which comprises three pixel regions, first, second and third pixel regions, and
color filters, disposed on the first, second and third pixel regions respectively, having wavelength selectivity on transmittance and having a maximum transmittance at a main wavelength of $\lambda 1$, $\lambda 2$ and $\lambda 3$ (unit: nm) respectively, which satisfies a relation $\lambda_1 < \lambda_2 < \lambda_3$; and
a thickness of the liquid crystal layer, d1, d2, and d3 (unit: nm), corresponding to the first, second and third pixel regions respectively satisfy following relation (11):

$$d2 < d3 \quad (11).$$

8. The liquid crystal display device according to claim 7, satisfying following expression (12):

$$d1 < d2 < d3 \quad (12).$$

9. The liquid crystal display device according to claim 5, wherein the optical film satisfies following expressions (13) and (14):

$$20\ nm \leq Re \leq 100\ nm \quad (13)$$

$$70\ nm \leq Rth \leq 300\ nm \quad (14).$$

10. The liquid crystal display device according to claim 5, wherein retardation in-plane of the optical film at a wavelength of 450, Re(450), retardation in-plane of the optical film at a wavelength of 550 nm, Re(550), and retardation in-plane of the optical film at a wavelength of 650 nm, Re(650) satisfy following expressions (15) and (16):

$$0.75 \leq Re(450)/Re(550) \leq 1.00 \quad (15)$$

$$1.00 \leq Re(650)/Re(550) \leq 1.25 \quad (16).$$

11. The liquid crystal display device according to claim 5, wherein an internal haze of the optical film is equal to or less than 0.05%.

12. The liquid crystal display device according to claim 1, employing a vertically aligned mode.

* * * * *